(12) United States Patent
Kaji

(10) Patent No.: US 7,110,329 B2
(45) Date of Patent: Sep. 19, 2006

(54) DEVICE AND METHOD FOR COMPENSATING FEED CONTROL AMOUNT

(75) Inventor: Toshihiko Kaji, Ehime (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 716 days.

(21) Appl. No.: 10/085,573

(22) Filed: Feb. 27, 2002

(65) Prior Publication Data

US 2002/0172104 A1    Nov. 21, 2002

(30) Foreign Application Priority Data

Feb. 27, 2001   (JP)   ............. 2001-051318

(51) Int. Cl.
*G11B 7/085* (2006.01)
(52) U.S. Cl. ............... 369/30.11; 369/53.37
(58) Field of Classification Search ........... 369/44.17, 369/44.18, 44.25, 44.26, 44.27, 44.28, 44.29, 369/47.32, 47.33, 47.34, 53.27, 53.31
See application file for complete search history.

(56) References Cited

U.S. PATENT DOCUMENTS 4,703,468 A * 10/1987 Baba et al. ............ 369/44.32
4,706,234 A * 11/1987 Okada .................... 369/30.01
5,218,453 A *  6/1993 Hashimoto ............. 369/44.28
5,808,982 A *  9/1998 Yun ....................... 369/44.28
5,995,464 A * 11/1999 Okamoto et al. ....... 369/53.22
6,133,562 A * 10/2000 Kuwayama ............. 369/44.28

FOREIGN PATENT DOCUMENTS

| JP | 07-169067 | 7/1995 |
| JP | 07-334852 | 12/1995 |
| JP | 08-055446 | 2/1996 |
| JP | 08-096535 | 4/1996 |
| JP | 2000-285478 | 10/2000 |

\* cited by examiner

*Primary Examiner*—Thang V. Tran
*Assistant Examiner*—Joseph Haley
(74) *Attorney, Agent, or Firm*—RatnerPrestia

(57) ABSTRACT

An optical pickup moves to the most inner circumference, then moves to outer circumference for a predetermined period and acquires address information there. Next, a difference XZ between the acquired address information and predetermined reference address information is calculated, and then difference YZ between address information which is acquired by performing above mentioned process in standard acceleration/deceleration control algorithm setting stage and the predetermined reference address information is calculated. Feed control amount is multiplied by a ratio between difference XZ and difference YZ.

17 Claims, 9 Drawing Sheets

1a

1b

1c

1d

DEVICE AND METHOD FOR COMPENSATING FEED CONTROL AMOUNT

FIELD OF THE INVENTION

The present invention relates to a feed control device and method thereof for compensating feed control amount of an optical pickup.

BACKGROUND OF THE INVENTION

Recently, personal computers have included Optical Disk Drives as well as Hard Disk Drives as standard equipment. At one time, the majority of optical disk drives were CD-ROM. Now DVD-ROM drives, and/or CD-R/CD-RW drives have become standard equipment. Further, DVD-R drives, DVD-RAM drives and DVD-ROM/CD-ROM drives have appeared in the market, and progress has been made in the design of optical disk drives within even higher performance and features.

FIG. 5 shows an example of an optical disk device for driving an optical disk such as a CD-ROM and a CD-RW. This optical disk drive is under control of Central Processing Unit (CPU) 21. Driver 17 controls drive rotation of spindle motor 12 and the motor 12 rotates an optical disk 11 at a constant linear velocity or a constant angular velocity. A laser beam is irradiated on a surface of the rotating optical disk 11 by optical pickup 13, moving radially from the inner circumference side to the outer circumference side of the disk 11. On the surface of the disk 11, data is recorded in a spiral by a recess called a pit where existence of the pit changes reflection quantity of laser beam. The optical pickup 13 reads data on the optical disk 11 by the change in reflection quantity of the laser beam.

Data read from the optical disk 11 is waveshaped by an analog front end 18. Signal processing (such as error correction and so on) is then performed by a digital signal processor 19. Data is then transferred to an external host 22 through decoder 20.

In order to read data correctly, the CPU 21 commands the driver 17 to perform focus control for focusing a laser beam on the optical disk 11, and tracking control for positioning a laser beam on a center of a track, based on output signal from the digital signal processor 19. Focus control is performed by driver 17 driving a lens 14, which is supported by wire in a housing of the optical pickup 13, perpendicularly to the surface of the optical disk 11. Tracking control is performed by the driver 17 driving the lens 14 in a horizontal direction radially to the surface of the optical disk 11 based on a gap between the center of the radiated laser beam spot and the center of the track detected by CPU 21 through a change in reflection quantity of the laser beam from the optical disk 11.

As described above, data is recorded in a spiral (this is generally called a track). Therefore, when reading data, the optical pickup 13 moves from the inner circumference of the disk to outer circumference side of the disk as time passes. Optical pickup 13 is moved through two kinds of movement. One kind of movement includes moving the lens 14 within the housing of the optical pickup 13. Another kind of movement includes moving the feed 15 to which the optical pickup 13 is fixed. Normally, the lens 14 moves within the housing of the optical pickup 13 at first to follow the track until the lens 14 moves a certain distance away from the center of the housing, and then the feed 15 moves so that the lens 14 returns to the center of the housing. The feed 15 is controlled by feed motor 16 which is under control of CPU 21 through the driver 17.

When reading data of an arbitrary position on the surface of the optical disk 11 based on a command from external device etc., a seek operation is performed. The seek operation includes moving the optical pickup 13 across track(s) from a present track to a target track where desired data is recorded. Movement of optical pickup 13 is accomplished through two kinds of operations. A seek operation of moving the feed 15 to carry the optical pickup 13 to a target track is called feed seek, and is used for comparatively long distance movement. On the other hand, moving the lens 14 within the housing of the optical pickup 13 to the target track without moving the feed 15 is called kick seek, and is used for comparatively short distance movement. Seek operation is performed by combining these two kinds of seek operations.

A control method of the feed 15 in feed seek operation is now described. CPU 21 searches the number of tracks from a present track to a target track and commands the driver 17 to move the optical pickup 13 across the number of tracks corresponding to the number searched. The driver 17 drives the feed motor 16 to control the drive of the feed 15 based on the command.

This command commands a feed control amount, which includes maximum speed in a constant-speed region, acceleration in an acceleration region, and acceleration in a deceleration region, in order to control drive of the feed 15. The feed control amount is provided based on a standard acceleration/deceleration control algorithm (hereinafter called standard control algorithm), which is stored in internal memory of CPU 21 or external memory 23 in advance. This standard control algorithm is created based on speed characteristics of the feed 15 (shown in FIG. 6) acquired by actually moving the optical pickup 13 from a certain location to a desired location in standard control algorithm setting stage. This speed characteristic of the feed 15 consists of acceleration region 61, constant-speed region 62 and deceleration region 63 as shown in FIG. 6. This standard control algorithm is to acquire standard setting for the feed 15 performances and set at product shipment. It is also called seek profile.

However, because of size dispersion of mechanical parts used for the feed 15, quality variation of the grease used, or size and characteristic change due to temperature variation and so on, a load applied to the feed motor 16 for moving the feed 15 in startup (hereinafter called starting load) can change from that in the setting stage. In that case, even if the feed control amount based on the standard control algorithm is given to the driver 17, speed characteristics of the setting stage as shown in FIG. 6 cannot be obtained, or there is a possibility that the optical pickup 13 cannot reach to the target track or overshoot. FIG. 7 and FIG. 8 show examples illustrating that there are problems in speed characteristics. When the starting load is heavier, problems such as the target speed cannot be achieved in acceleration (as shown by line 71) or stalling before the target track when decelerating (as shown by line 72) occur. On the other hand, when the starting load is lighter, acceleration is too great and problems such as the speed exceeding the setting speed in acceleration (as shown by line 81) or that the optical pickup cannot stop at the target track because enough deceleration is not achieved and overshoots in deceleration (as shown by line 82) occur. In other words, the starting load is based on the mechanical resistance applied on the feed motor 16 when moving the feed 15.

SUMMARY OF THE INVENTION

In a feed control device of an optical pickup for an optical disk device capable of reading data from and/or writing data to an optical disk, the optical pickup is fixed to a feed and a feed motor drives the feed. At startup, the feed is moved and the movement amount is measured. The measured value is compared with a predetermined reference value and then a reference feed control amount is compensated according to the comparison result.

DETAILED DESCRIPTION OF THE INVENTION

The present invention relates to a device and a method for compensating (effecting) feed control amount for controlling feed movement in a feed seek operation. First, the starting load (which is a load applied on a feed motor to move a feed element at startup), is measured. Then a predetermined feed control amount is varied to achieve optimum feed control amount based on the measured result of the starting load.

A preferred embodiment of this invention is described with reference to the drawings. Detailed explanations regarding those items common to the prior art and the present invention are omitted.

Figure 5:
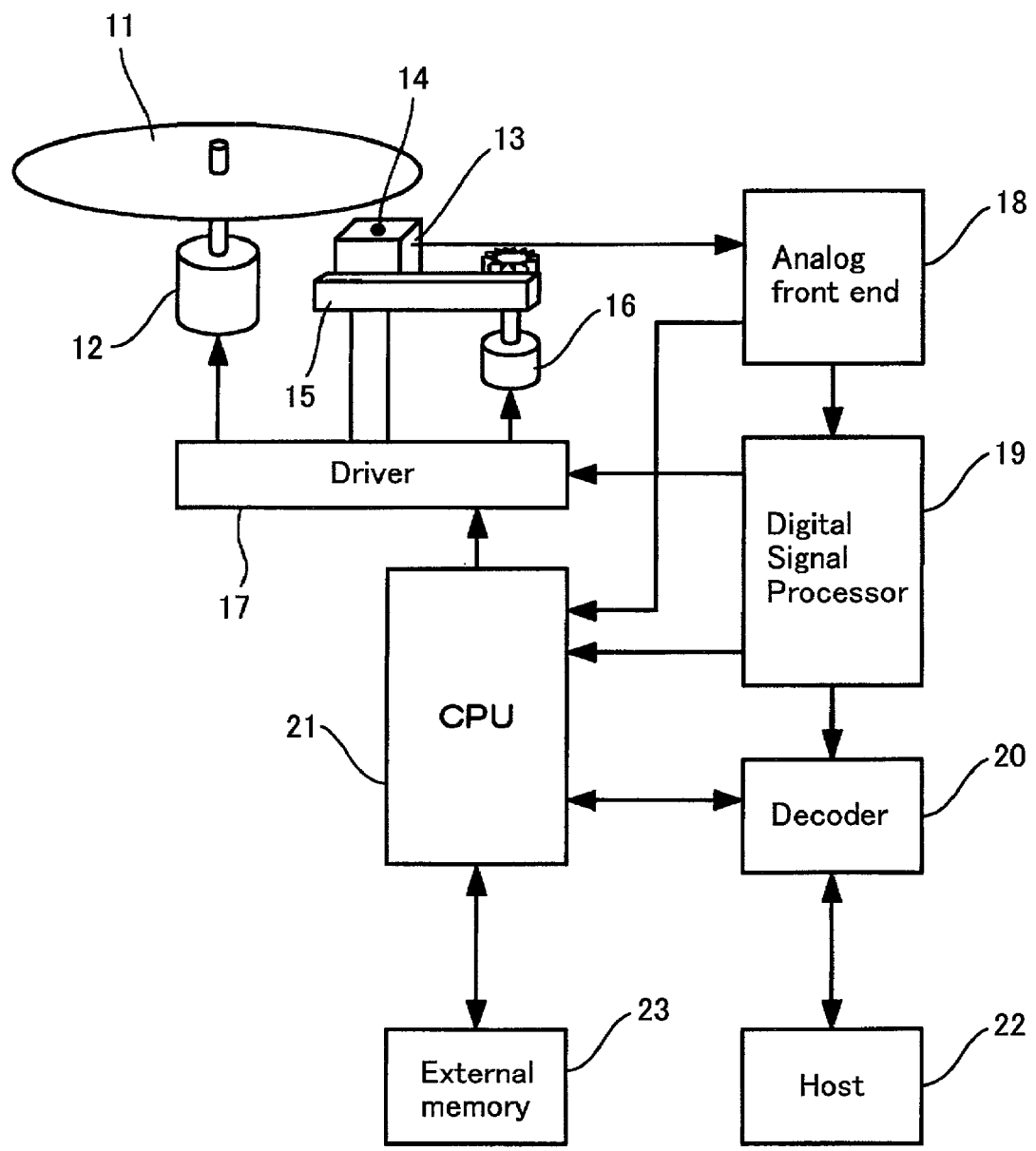
FIG. 5 is a block diagram of an optical disk device in the prior art.
Figure 6:
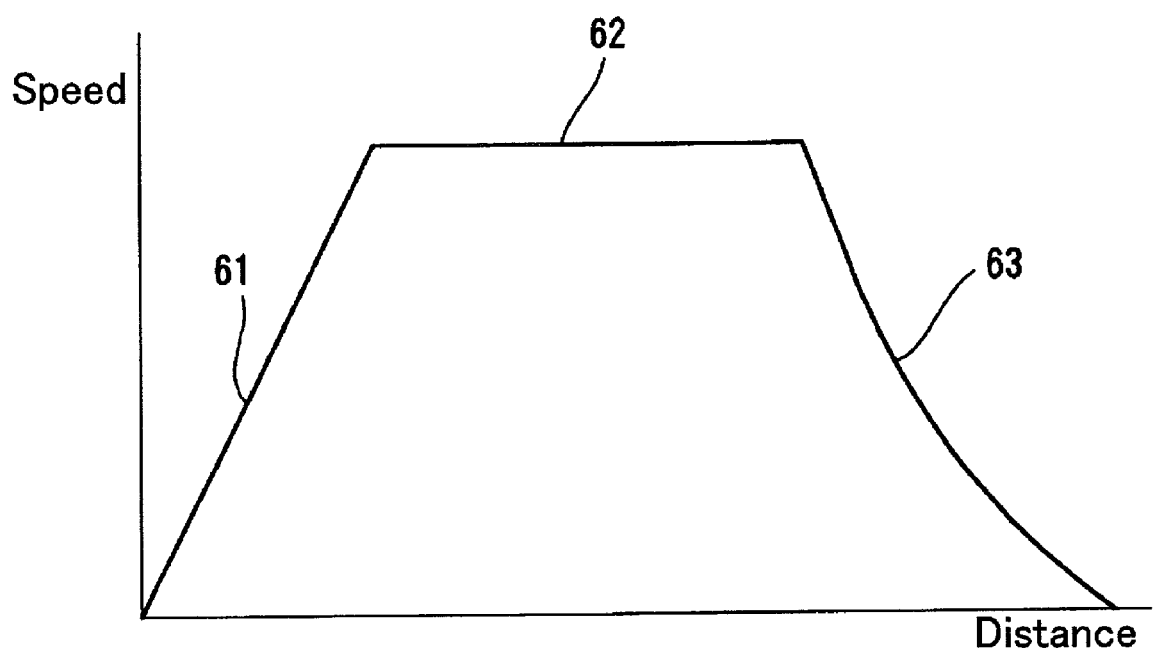
FIG. 6 is a diagram showing speed characteristics of feed in setting a standard acceleration and deceleration control algorithm.
Figure 7:
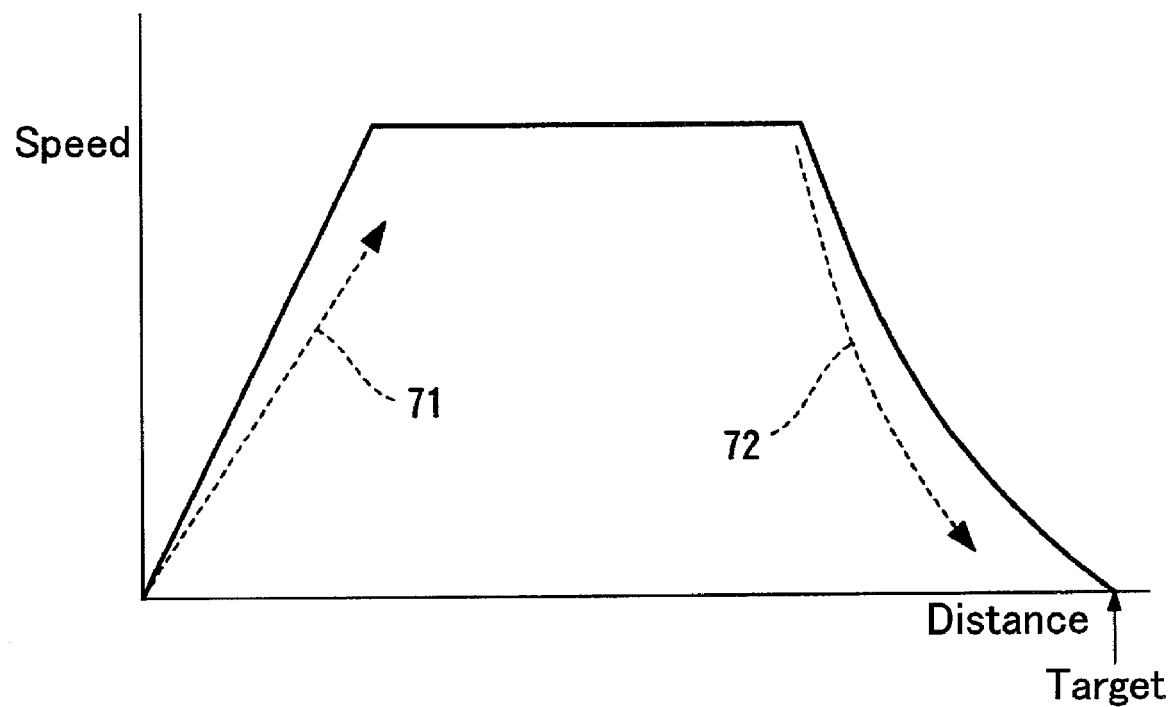
FIG. 7 shows speed characteristics of feed when the starting load applied on a feed motor is heavy.
Figure 8:
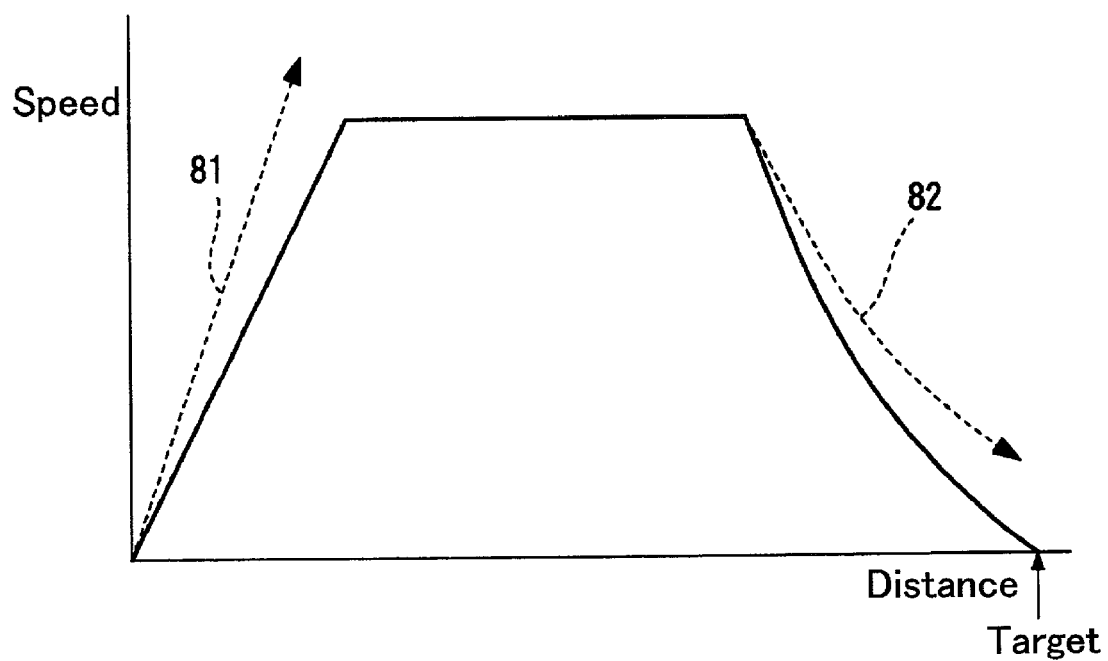
FIG. 8 shows speed characteristics of feed when the starting load applied on a feed motor is light.

A preferred embodiment of the present invention is explained by partially referring to the optical disk drive of FIG. 5. In this embodiment, a CD-ROM is used as an example. A feed seek of the optical disk device is performed by CPU 21 driving feed motor 16 through driver 17 to move optical pickup 13 as described in the explanation of the prior art. Regarding this operation, CPU 21 adds compensation, which corresponds to the starting load which is applied on the feed motor 16 at the start of moving the feed 15, to feed control amount. This compensation value is memorized in the internal memory of CPU 21 or in external memory 23.

Figure 1:
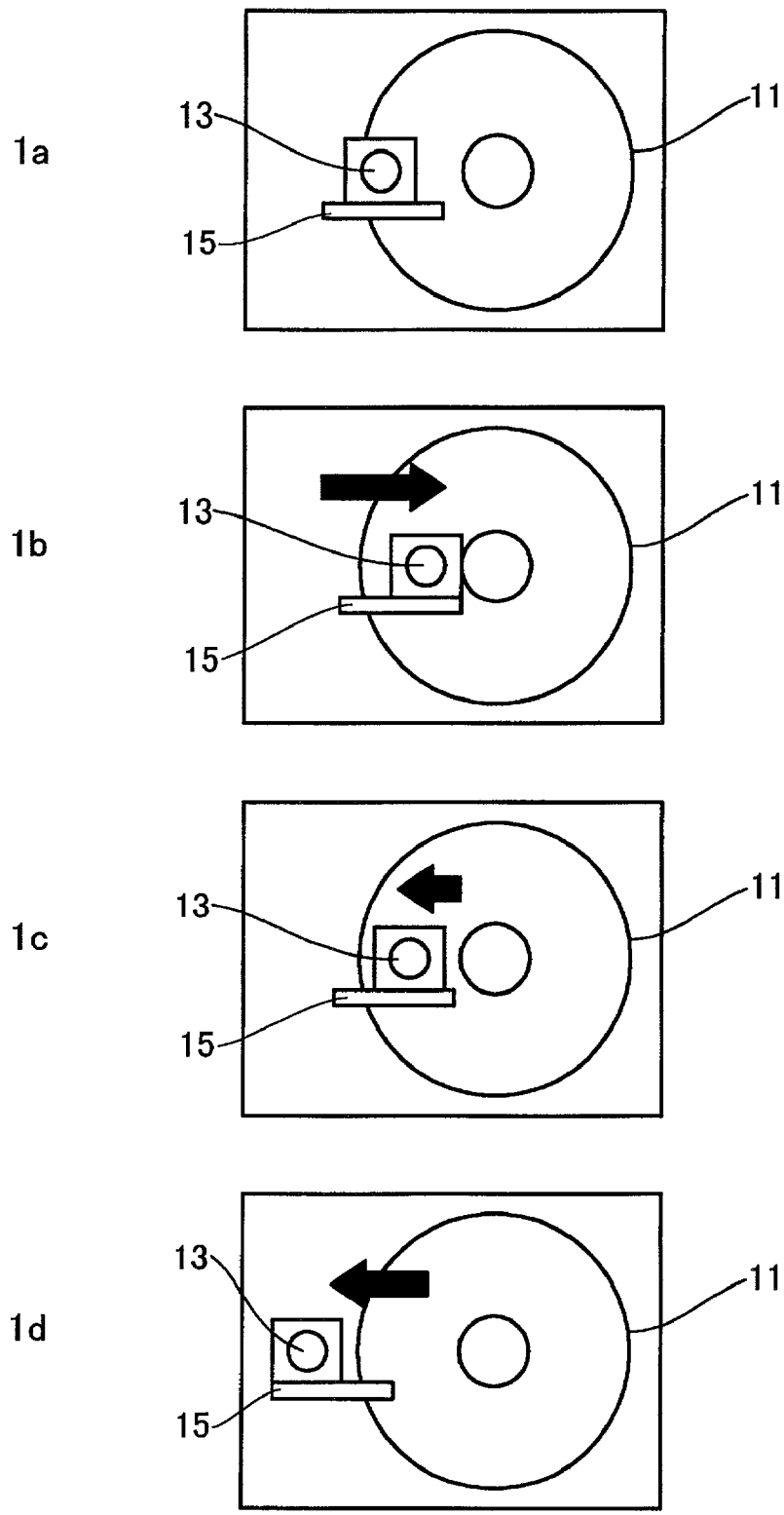
FIG. 1 illustrates movement of an optical pickup in an exemplary embodiment of the present invention.

Hereinafter compensation of the feed control amount is described. First, time information 200 is memorized in a memory. The memory may be an internal memory of CPU 21 or external memory 23. Time information is address information recorded on optical disk 11 and can be used to get the position of the optical pickup 13. Then, procedures shown in FIG. 1 are performed. Drive control of the feed 15 is performed by that a predetermined feed control amount is input to driver 17, and then pulse based on the predetermined feed control amount is output from a pulse oscillator (not shown) built-in the driver 17 to the feed motor 16. The predetermined feed control amount means maximum speed in constant-speed region, acceleration in acceleration region, and acceleration in deceleration region.

At first, when power is applied to the optical disk drive (FIG. 1a), the CPU 21 drives the feed motor 16 through the driver 17 and moves the optical pickup 13 to a stopper position of the most inner circumference (FIG. 1b). Next, CPU 21 gives the predetermined feed control amount to the driver 17 to drive the feed motor 16 for moving the optical pickup 13 to outer direction for a predetermined short time period (FIG. 1c). By the above-mentioned action, the optical pickup 13 is located a little outside from the stopper position of the most inner circumference. Here, a spin up process is performed to acquire time information 100 of this point. The spin up process means to perform servo performances including focus servo, tracking servo and spindle servo for obtaining time information from the optical disk 11. This process is performed when power supply switch turns on and when an optical disk is mounted. CPU 21 compensates the feed control amount based on the result of comparing the time information 100 and the memorized time information 200.

In regard to the stopper location of the most inner circumference, it may be the most inside position of the disk 11 that the optical pickup 13 can move to when there is no stopper.

The memorized time information 200 is acquired by performing the process shown in FIG. 1 at standard acceleration/deceleration control algorithm setting stage. The process includes movement of the optical pickup 13 to the most inner circumference position and then to outer direction with the predetermined feed control amount, and spin up process. The time information 200 is used as a reference to determine the starting load if it is heavy or light.

Figure 2:
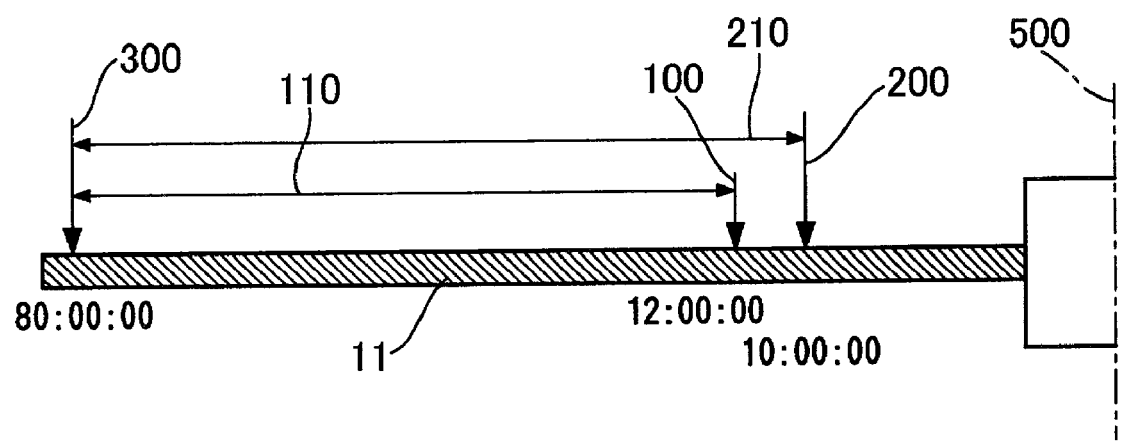
FIG. 2 shows the relation between acquired time information and reference time information when the starting load applied on a feed motor is light in an exemplary embodiment of the present invention

For example, as shown in FIG. 2, if the predetermined memorized time information 200 is assumed to be 10 minutes 00 second 00 frame, and the time information 100 of a 12 minutes 00 second 00 frame is now acquired at spin up process, it is found that optical pickup 13 is in a outer circumferential side than position of the time information 200. Centerline 500 is a center of the optical disk 11. Namely, in movement of the optical pickup 13 to the outer circumference, the optical pickup 13 moves too much to the outer circumference because starting load at present is lighter than that of in the standard control algorithm setting stage. Therefore, the predetermined feed control amount is to be compensated to correspond to the lighter starting load. On the other hand, if acquired time information 100 is 08 minutes 00 second 00 frame, it is found that the optical pickup 13 is in inner circumferential side than the time information 200. Namely, in movement of the optical pickup 13 to outer circumference, the starting load at present is heavier than that in the standard control algorithm setting stage. In this case, the feed control amount is compensated to correspond to the heavier starting load. Thus, actual starting load can be measured to compensate the feed control amount, and stable feed seek can be possible. In CD-ROM, there are 75 frames per second and in most cases the data amount of one frame consists of 2048 bytes.

In addition, more stable starting load determination becomes possible if the time period that the optical pickup 13 moves to the outer circumference from the stopper position is set to be shorter than the time that the pickup 13 moves to the most inner circumference, in order to prevent the feed 15 from moving out of the optical disk 11 (as shown in FIG. 1d) because of too much movement of the feed 15.

Besides, in order to move the optical pickup 13 to the stopper position of the most inner circumference without fail, drive time of the feed motor 16 is set to be longer than the time necessary for the optical pickup 13 to move from the most outer circumferential position to the most inner circumference position. By this setting, a more stable starting load determination is possible because optical pickup 13 can move to the stopper position of the most inner circumference.

The movement of the optical pickup 13 to the most inner circumference is performed when power supply switch turns on, and when an optical disk media is mounted. The present invention utilizes the performance of this optical pickup movement to determine the starting load applied on the feed motor 16 to compensate the feed control amount.

After starting-load determination is done as described, CPU 21 calculates the difference between the acquired time information 100 and reference time information 300 to compensate the feed control amount. The reference time information 300 is time information that is memorized in internal memory of CPU 21 or external memory 23 in advance. It can be set arbitrarily if it is in the outer circumference from time information 100 when the starting load is determined to be light, and if it is in the inner circumference from time information 100 when the starting load is determined to be heavy. In this preferred embodiment, time information near the outer most circumference is used as the predetermined reference time information 300.

In FIG. 2, centerline 500 is the center of the optical disk. For example, if the reference time information 300 is assumed to be 80 minutes 00 second 00 frame in CD-ROM, and acquired time information 100 is 12 minutes 00 second 00 frame, difference XZ 110 between the reference time information 300 and the time information 100 in frame is 306000 frames. On the other hand, if time information 200 memorized in the internal memory of CPU 21 or the external memory 23 is 10 minutes 00 second 00 frame, difference YZ 210 between the reference time information 300 and the memorized time information 200 in frame is 3150000 frames.

Here, if acceleration (both acceleration in an acceleration region and deceleration region) of the predetermined feed control amount which is given to the driver 17 from the CPU 21 for aforementioned movement of the optical pickup 13, is W0 and the feed control amount W1 for positioning the feed 15 to 10 minutes 00 second 00 frame is expressed as below.

$$W1 = (XZ/YZ) \times W0$$

Therefore, it is calculated as below.

$$W1 = (306000/315000) \times W0 = 0.97 \times W0$$

The calculated compensation value 0.97 is stored in the internal memory of the CPU 21 or the external memory 23. In feed seek operation, the feed control amount in acceleration control, which is feed control amount provided in accordance with the standard acceleration/deceleration control algorithm, is always multiplied by the compensation value 0.97 for stable feed seek operation from the beginning.

Figure 3:
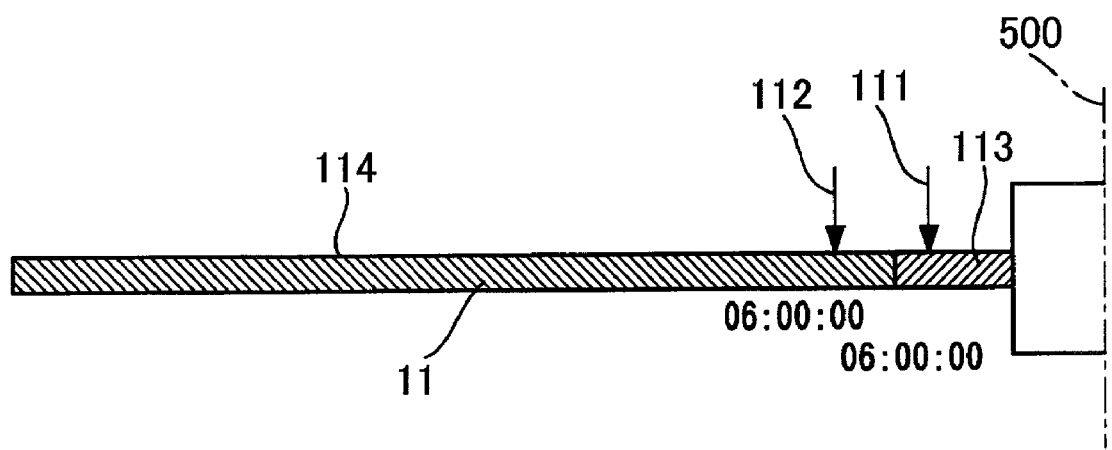
FIG. 3 illustrates time information when the starting load is heavy in an exemplary embodiment of the present invention.

Further, in an optical disk 11 that there is no absolute time information in lead-in area such as CD-ROM, if time information 100 is in the lead-in area of the first session, there will only be relative time information. Therefore, in referring to FIG. 3, even if time information 100 of 06 minutes 00 second 00 frame is acquired, it is not distinguished if the time is time information 111 in lead-in area 113 or time information 112 in data area 114, and there is a possibility that starting load determination is mistaken. Therefore, in the optical disk 11 that has no absolute time information in lead-in area, all the time information in lead-in area is treated as 00 minute 00 second 00 frame to avoid possibility of this kind of confusion. When starting load is heavy and the time information 100 acquired at first is in lead-in area of the first session, for example, a certain value is repeatedly added to the predetermined feed control amount W0 in acceleration control to make it big until the acquired time information 100 becomes bigger than 00 minute 00 second 00 frame to determine the starting load accurately.

Figure 4:
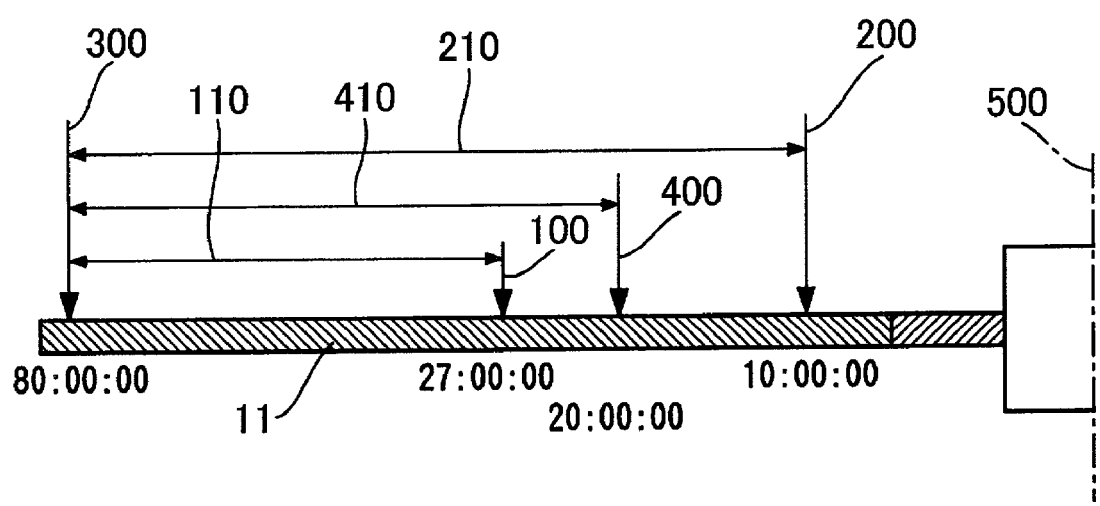
FIG. 4 shows the relation between acquired time information, reference time information and limit value when the starting load is extremely light in an exemplary embodiment of the present invention.

In FIG. 4, when the starting load is extremely light, and if acquired time information 100 at first is 27 minutes 00 second 00 frame, difference XZ 110 previously explained between the reference time information 300 and the time information 100 is 238500 frames. And the difference YZ 210 between the time information 200 and the time information 300 is 315000 frames. In this case, if acceleration (in acceleration region and in deceleration region) of the predetermined feed control amount that CPU 21 gives to the driver 17 in moving the optical pickup 13 to outer direction is W0, the feed control amount W1 for positioning the feed 15 at 10 minutes 00 second 00 frame is expressed as below.

$$W1 = (XZ/YZ) \times W0$$

And it can be calculated as below.

$$W1 = (238500/315000) \times W0 = 0.76 \times W0$$

This W1 is too small when comparing with W0. In other words, the compensation value is too small and there is a possibility that optimum feed control is not possible. Therefore the limit value is set beforehand and stored in the internal memory of CPU 21 or external memory 23 to enable optimum feed control. For example, if 20 minutes 00 second 00 frame is set as a limit value 400 and stored, and the acquired time information 100 at first over this limit value, the limit value 400 is treated as the acquired time information. In this case, the acquired time information 100 is 27 minutes 00 second 00 frame and it is more than the limit value 400 of 20 minutes 00 second 00 frame, thus the limit value 400 is treated as the acquired time information. Therefore, the difference 410 of 270000 frames is treated as the difference XZ. As a result, feed control amount W1 is calculated as below.

$$W1 = (XZ/YZ) \times W0$$
$$= (270000/315000) \times W0 = 0.86 \times W0$$

Then, based on this feed control amount W1, the process operation shown in FIG. 1 is performed again to acquire new time information 100, and then new compensation value of the feed control amount W1 which is calculated using the new time information 100, will be stored and used as new compensation value to multiply to the feed control amount in acceleration control in feed seek. In addition, even if the starting load is extremely heavy, compensation can be made using a limit value as in the case of extremely light starting load. In this case, the limit value is set to be the inner circumference than the time information 200 and if acquired time information is on or less than the limit value, this limit value is used for compensation, as well as the case that starting load is extremely light. By this setting, even if variation of starting load is wide, it is possible to prevent compensated feed control quantity from becoming too small or too big compared with the original feed control amount, and to perform a stable feed seek.

As described above, a stable feed seek can always be achieved by determining starting load, then calculating compensation value of the feed control amount in acceleration control and multiplying the compensation value by the feed control amount of acceleration control in feed seek in advance of feed seek operation. The process for calculating the compensation value may be performed automatically when the optical disk device is started, or when every time seek operation is performed. It may also be performed at the users will.

In this embodiment, construction that predetermined reference feed control amount measured at setting stage is memorized in memory in advance, then the memorized feed control amount is multiplied by ratio between movement amount of optical pickup and the reference value, and the memorized feed control amount does not change, is described. However, another construction that the memorized feed control amount is taken over by new feed control amount is possible. The new feed control amount is acquired by calculating ratio between movement amount of the optical pickup and the reference value, and multiplying the memorized feed control amount by the calculated ratio. In other words, when W1 (described above) is calculated, W1 is memorized as a new feed control amount and work as feed control amount until W1 is newly calculated.

In addition, this embodiment uses acceleration in the acceleration region and deceleration region for compensating feed control amount, but maximum speed in constant-speed region can be compensated. Also, memorized time information 200 is not limited to 10 minutes 00 second 00 frame. Limit value is not limited to 20 minutes 00 second 00 frame, and plural limited values can be provided to select optimum one from them.

Figure 9:
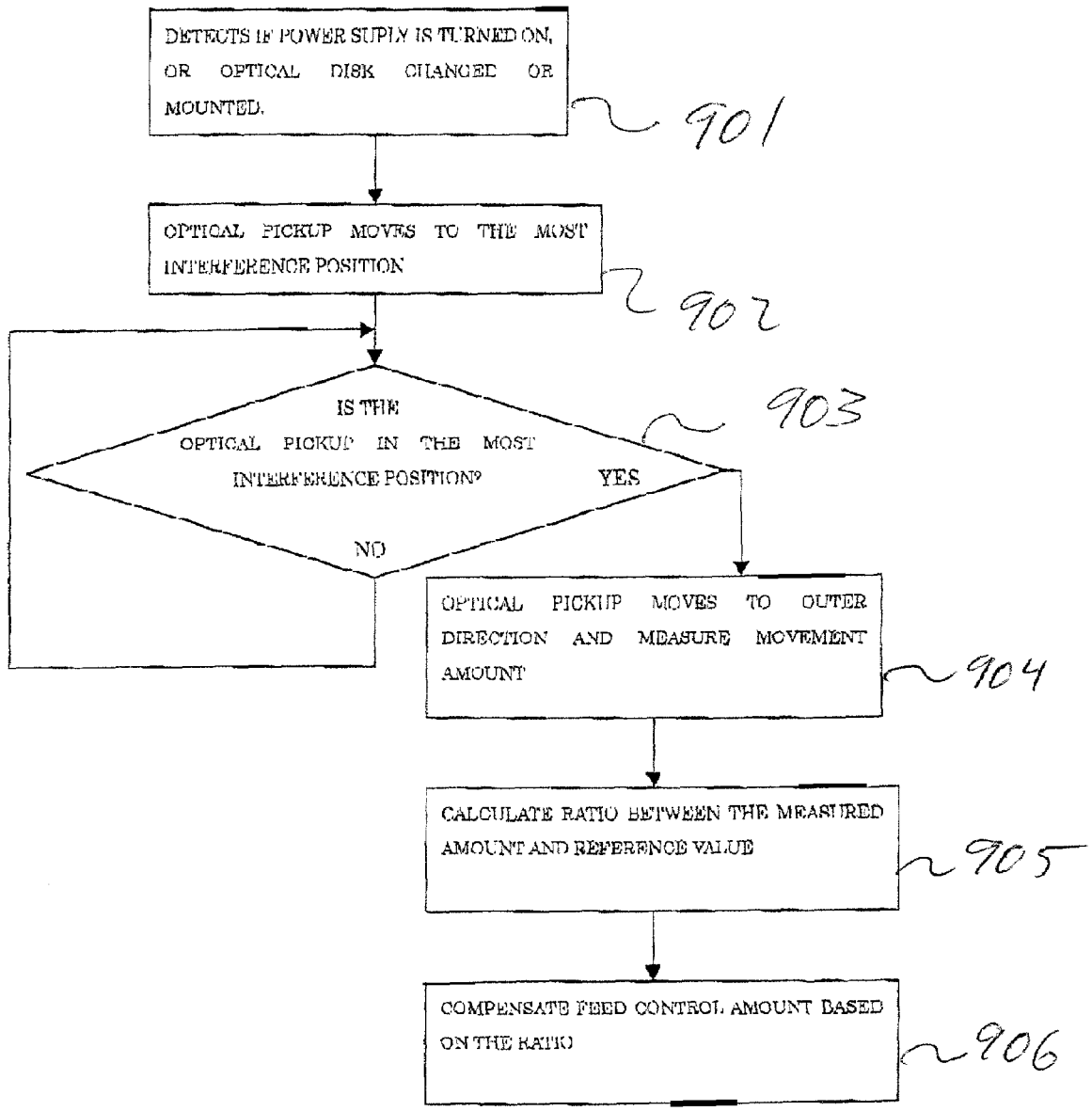
FIG. 9 is a flow chart diagram showing compensation method for feed control amount in an exemplary embodiment of the present invention.

FIG. 9 is a flow chart diagram showing a compensation method for a feed control amount in an exemplary embodiment of the present invention. At step 901, power supply of the optical disk drive is turned on or an optical disk 11 is changed or mounted. At step 902, optical pickup 13 is moved to the stopper position of the most inner circumference. At step 903, it is determined if the optical pickup is in the stopper position. Next at step 904, when the optical pickup is in the stopper position, the optical pickup 13 is moved to the outer direction with a predetermined feed control amount and the movement amount is measured. At step 905, the ratio between the measured movement amount and the predetermined reference amount is calculated. Then at step 906, the feed control amount is multiplied by the calculated ratio to compensate the feed control amount.

As described above, according to the present invention, optimum feed control amount is acquired and stable seek operation is performed by determining the starting load, then adding compensation to the predetermined feed control amount, based on the determination.

What is claimed is:

1. A feed control device for use with an optical pickup which is used with an optical disk, said feed control device comprises:
   a feed to which said optical pickup is fixed;
   a feed motor for driving said feed;
   a central processing unit for providing feed control amount for controlling said feed based on address information read from said optical disk; and
   a driver for giving said feed control amount to said motor for moving said feed,
   wherein said feed moves based on a ratio between address information acquired from said optical disk by moving said feed for a predetermined period and a predetermined reference address information
   and said ratio compensates said feed control amount as a compensation value.

2. The feed control device of claim 1, said feed control device further comprising a memory for storing said feed control amount, and wherein feed control amount newly acquired by multiplying said reference feed control amount by said compensation value is overwritten in said memory as a new reference feed control amount.

3. A feed control device for use with an optical disk pickup which is used with an optical disk, said feed control device comprising:
   a feed to which said optical pickup is fixed;
   a feed motor for driving said feed;
   a central processing unit for providing feed control amount based on address information read from said optical disk;
   a driver for giving feed control amount to said motor for moving said feed;
   wherein, at startup, said feed moves based on a predetermined feed control amount and acquires address information there and then the acquired address information is compared with a predetermined reference address information, then the predetermined reference feed control amount is effected based on the comparison result.

4. A feed control device for compensating feed control amount for controlling movement operation of a feed which an optical pickup is fixed to, said feed control device comprising:
   a driver for driving said feed; and
   a central processing unit for transmitting a feed control amount to said driver,
   so that:
   said optical pickup is moved to the most inner circumference position of said optical disk, and then said optical pickup is moved to outer circumferential direction for predetermined period and acquiring address information from said optical disk at that point;
   difference XZ between said acquired address information and a predetermined reference address information is calculated;
   difference YZ between address information acquired by performing standard acceleration/deceleration control algorithm at setting stage and said predetermined reference address information is calculated; and
   said feed control amount is compensated by multiplying ratio between said difference XZ and said difference YZ.

5. The feed control device of claim 4, wherein said standard acceleration/deceleration control algorithm sets acceleration in acceleration region, maximum speed in constant speed region and acceleration in deceleration region in feed control amount for movement operation.

6. A method for compensating feed control amount for controlling driving of a feed, which optical pickup is fixed to, driven by a feed motor, said method comprising the steps of:
effecting said feed control amount based on a ratio between address information acquired from said optical disk by moving said feed for a predetermined period and a predetermined reference address information,
compensating said feed control amount as a compensation value using said ratio,
wherein said steps are initiated responsive to at least one of when a power supply switch turns on or when said optical disk is changed.

7. A method for compensating feed control amount for controlling driving of a feed to which optical pickup is fixed, said method comprising the steps of:
moving said optical pickup to the most inner circumference position of a optical disk;
moving said optical pickup to outer circumferential direction for a predetermined period and acquiring address information at this point;
calculating difference XZ between said acquired address information and a predetermined reference address information;
calculating difference YZ between address information acquired by performing standard acceleration/deceleration control algorithm at setting stage and said predetermined reference address information is calculated; and
multiplying a ratio between said difference XZ and said difference YZ by said feed control amount.

8. The method of claim 7 wherein moving period to move said optical pickup to the most inner circumference position is longer than said predetermined period.

9. The method of claim 7 wherein moving period to move said optical pickup to the most inner circumference position is longer than the time period that moving said optical pickup from the most outer circumference position to the most inner circumference position.

10. The method of claim 8 wherein moving period to move said optical pickup to the most inner circumference position is longer than the time period that moving said optical pickup from the most outer circumference to the most inner circumference position.

11. The method of claim 7 wherein if a position that said optical pickup is moved toward outer circumference for predetermined period is within lead-in area of a first session, said address information is treated as zero.

12. The method of claim 8 wherein if a position that said optical pickup is moved toward outer circumference for predetermined period is within lead-in area of a first session, said address information is treated as zero.

13. The method of claim 9 wherein if a position that said optical pickup is moved toward outer circumference for predetermined period is within lead-in area of a first session, said address information is treated as zero.

14. The method of claim 10 wherein if a position that said optical pickup is moved toward outer circumference for predetermined period is within lead-in area of a first session, said address information is treated as zero.

15. The method of claim 7, wherein if said acquired address information is extremely bigger or extremely smaller than said address information acquired by performing standard control algorithm at setting stage, predetermined limit value is used instead of said address acquired information in order to enable optimum feed control.

16. The feed control device of claim 1, wherein said feed control amount is effected responsive to at least one of said power supply switch being turned on or said optical disk being changed.

17. The feed control device of claim 3, wherein said feed control amount is effected responsive to at least one of said power supply switch being turned on or said optical disk being changed.

* * * * *